Dec. 30, 1941.                    W. O. LUM                    2,268,218
                                 FLUID SEAL
                            Filed Sept. 7, 1940
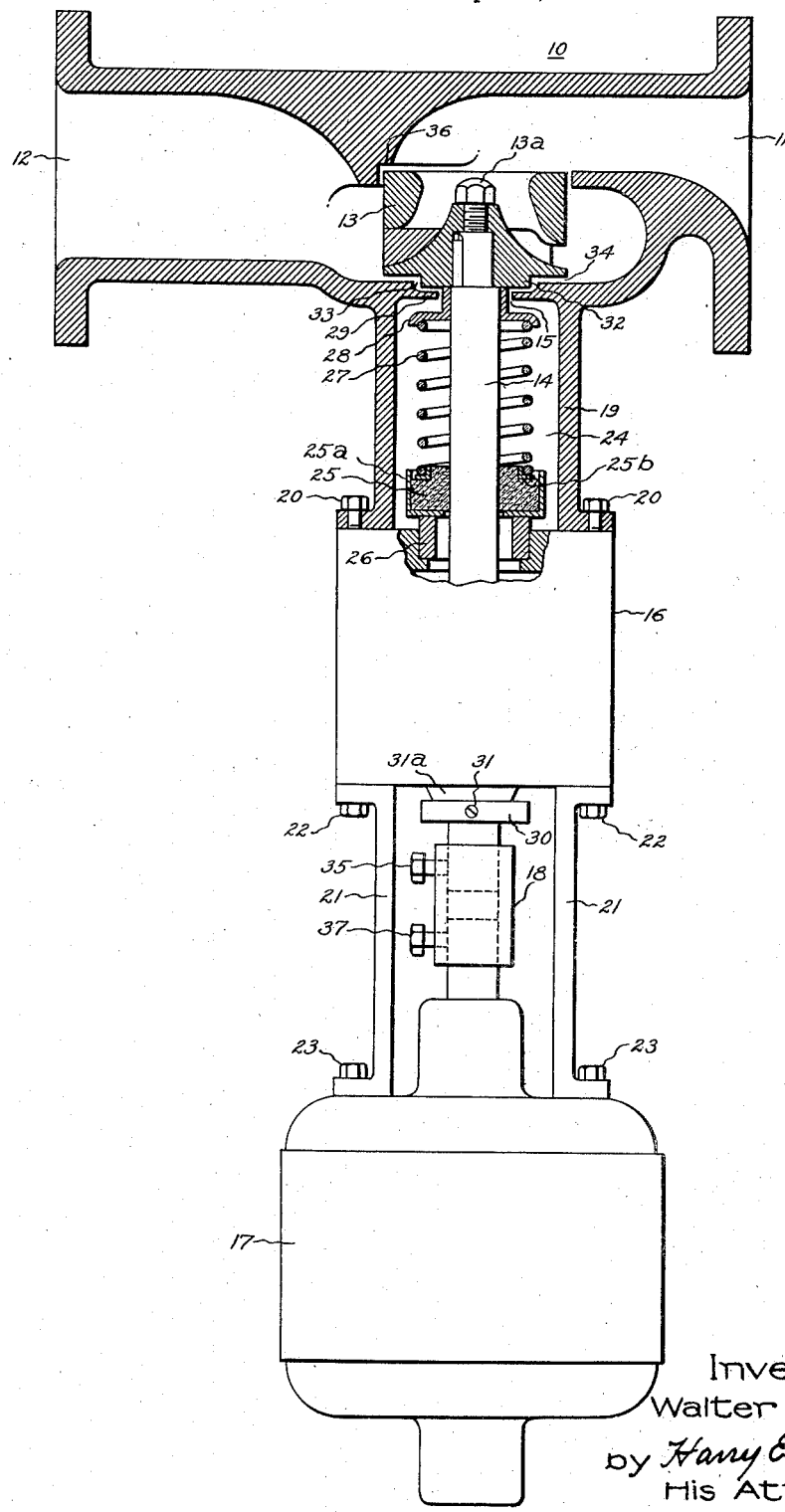
Inventor:
Walter O. Lum,
by Harry E. Dunham
His Attorney.

Patented Dec. 30, 1941

2,268,218

UNITED STATES PATENT OFFICE 2,268,218

FLUID SEAL

Walter O. Lum, West Orange, N. J., assignor to General Electric Company, a corporation of New York Application September 7, 1940, Serial No. 355,777

2 Claims. (Cl. 286—7)

My invention relates to fluid seals, and more particularly to fluid seals of the type used to prevent leakage of fluid around movable shafts or drive members.

While my invention is applicable to shaft seals generally, it is particularly applicable to shaft seals of the type used in rotary pumps to provide a seal between the impeller or rotary member and the pump casing.

Pumps are often used to circulate fluid in systems having a large fluid capacity such as, for example, hot water heating systems. When the shaft seals or packing between the impeller shaft and the casing become worn they leak fluid and it is necessary to replace them to prevent excessive loss of fluid therethrough. When the packings are removed for inspection or replacement either all of the fluid must be drained from the system or expensive shut-off valves must be provided to isolate the pump from the fluid line as otherwise the system fluid will leak out between the shaft and the casing.

Also, there are numerous other devices wherein the driving or control shaft extends through a fluid casing below the level of the fluid therein and must, therefore, be provided with a packing or seal. In such devices it is usually necessary to drain or otherwise shut off the fluid from the casing before the packing or shaft seal may be removed for inspection or replacement.

Accordingly, it is an object of my invention to provide a shaft seal arrangement designed so that the shaft seal may be removed for inspection or replacement without the excessive loss of fluid around the shaft.

It is a further object of my invention to provide a pump with a shaft seal that may be removed without excessive loss of fluid between the impeller shaft and the casing so that the seal may be replaced without removing the fluid from the system to which the pump is connected or providing shut-off valves to isolate the pump.

Further objects and advantages of my invention will become apparent as the following description proceeds, and the features of novelty which characterize my invention will be pointed out in particularity in claims annexed to and forming a part of this specification.

In the drawing, the single figure represents, partly in section, a motor driven pump embodying my invention.

Referring to the drawing there is disclosed a pump 10 having an inlet passage 11 and an outlet passage 12 adapted to be connected to a system in which fluid is to be pumped or circulated. The pump impeller 13 is mounted, by a fastening member 13a, on a drive shaft 14 extending through an aperture 15 in the pump casing. The drive shaft 14 is supported by bearings (not shown) mounted in the bearing housing 16 and is driven by a suitable motor 17 through a coupling 18 having fastening screws 35 and 37. The casing of pump 10 has a depending flanged sleeve portion 19 to the end of which is secured the bearing housing 16 by suitable fastenings 20. The motor 17 is suspended from the bottom of the bearing housing 16 by supports 21 secured to the bearing housing by the fastenings 22 and to the motor by the fastenings 23.

The impeller 13 and the drive shaft 14 are shown in the normal operating position and it will be noted that there is sufficient clearance between the impeller, drive shaft and the pump casing to prevent any rubbing action there between. Fluid in the pump casing normally leaks through this clearance space around the shaft and fills a seal chamber 24 defined by the extending sleeve portion 19 and the top of the bearing housing 16. A main outer shaft seal is provided for preventing the leakage of fluid from the seal chamber 24 into the bearing housing. This shaft seal comprises a resilient sealing member 25 slidably mounted on the shaft 14 and forced by a compression spring 27 into engagement with a stationary thrust or sealing ring 26 mounted on the bearing housing 16. Preferably the sealing member 25 is partially enclosed in a metallic ferrule 25a to prevent excessive wear of the portion which bears against the thrust ring 26. One end of the compression spring 27 bears against a bearing ring 25b mounted on the sealing member 25 and the other end is carried in a retaining cup 28 fastened to the shaft 14 in any suitable manner and this spring not only acts to force the sealing member 25 into engagement with the thrust ring 26 but also exerts an axial thrust on the shaft 14 which tends to move it upwardly. The shaft 14 is maintained in the illustrated operating position by means of a thrust collar 30 which may be secured to the shaft 14 in any suitable manner such as by a set screw 31. The thrust collar bears against a stationary bearing member 31a extending from the bearing housing 16.

It will be noted that the lower side of the impeller is provided with an extended portion 32 which rides above a complementary groove 33 in the pump casing wall 29 leaving a space or passageway 34 therebetween. When the impeller connected to the shaft 14 moves in an axial direction downwardly in a manner described below so as to cause the portion 32 to enter into the groove 33 the space 34 is closed and a second inner auxiliary seal is provided between the shaft 14 and the pump casing. In other words, the portion 32 of the impeller acts as a valve which, when moved into engagement with a valve seat formed by the groove 33 in the wall portion 29 of the pump casing, prevents passage of fluid from the pump casing into the seal chamber 24.

When it is desired to remove the sealing member 25 for the purposes of inspection or repair, the following operations are performed. The fastening members 35 and 37 are unscrewed releasing the shaft 14 from the coupling member 18. Shaft 14 is then pulled downward to close space 34. The fastening members 20 and 31 are then removed permitting the entire assembly comprising the bearing housing 16, the motor 17, the supports 21 and the coupling 18 to be slid downwardly off the end of shaft 14. When the thrust ring 26, which is mounted in the bearing housing 16, is removed the sealing member 25 is forced downwardly on the shaft 14 by the spring 27. At the same time the axial thrust on the shaft 14 normally caused by the compression of the spring 27 is removed permitting the shaft to remain in downward position so that the extended portion of the impeller 32 remains in contact with the groove 33 to form a second seal which prevents the passage of fluid from the pump casing into the seal chamber 24 through passage 34. The sealing member 25 may then be removed by sliding it off the end of the shaft 14.

Thus it is seen that in my improved shaft seal construction when the normally operative shaft seal 25 is removed, a second normally inoperative shaft seal comes into operation and prevents appreciable leakage of fluid around the shaft. Of course, when the shaft seal 25 is removed, the amount of fluid already in the seal chamber 24 will leak out, but the amount of this fluid is too small to cause damage or inconvenience.

In reassembling the above described operations are reversed. When the bearing housing 16 is secured in place, the compression of the spring 27 by the thrust ring 26 forces the shaft 14 upwardly until the impeller comes in contact with a stop 36 on the inside of the pump casing. The operation of pulling the shaft 14 and the impeller 13 down to the normal operating position against the bias of spring 27 is facilitated if the coupling screw 35 is first tightened to secure the coupling on the end of the shaft 14. The coupling 18 may then be used as a convenient gripping member to pull the shaft 14 downwardly to the proper operating position at which the thrust collar 30 is secured to shaft 14 set by turning the screw 31. The screw 37 of coupling 18 is then tightened to secure the coupling 18 to the drive shaft of the motor 17 and the pump is again in condition for operation.

What I claim as new and desire to secure by Letters Patent of the United States is:

1. In a shaft seal arrangement, the combination comprising a fluid casing having an aperture therein, a rotary member in said casing, a shaft secured to said rotary member projecting through said aperture, said rotary member having a face adapted to engage said casing and close said aperture upon an axial movement of said shaft but being spaced therefrom in a normal operating position to permit free rotary movement thereof, a sleeve member projecting outwardly from said casing and arranged coaxially with said shaft, a sealing member slidably mounted on said shaft within said sleeve member, the outer end of said sleeve member being spaced from said shaft to permit insertion and removal of said sealing member therethrough, a shaft bearing housing detachably secured to said sleeve member and arranged to close the outer end thereof to form a seal chamber, said bearing housing having a sealing ring extending therefrom and cooperating with said sealing member to provide a shaft seal for preventing leakage of fluid from said seal chamber, means for maintaining said sealing member in contact with said sealing ring and for biasing said shaft to said normal operating position, said shaft being movable axially against the force of said biasing means to cause said rotary member to close said aperture and provide an inner seal whereby said sealing member may be removed from the outer end of said sleeve member upon a removal of said bearing housing without loss of fluid from said casing.

2. In a shaft seal arrangement, the combination comprising a fluid casing having an aperture therein, a rotary member in said casing, a shaft secured to said rotary member projecting through said aperture, said rotary member having a face adapted to engage said casing and close said aperture upon an axial movement of said shaft but being spaced therefrom in a normal operating position to permit free rotary movement thereof, a sleeve member projecting outwardly from said casing and arranged coaxially with said shaft, a sealing member slidably mounted on said shaft within said sleeve member, the outer end of said sleeve member being spaced from said shaft to permit insertion and removal of said sealing member therethrough, a shaft bearing housing detachably secured to said sleeve member and arranged to close the outer end thereof to form a seal chamber, said bearing housing having a sealing ring extending therefrom and cooperating with said sealing member to provide a shaft seal for preventing leakage of fluid from said seal chamber, a spring connected to said shaft for forcing said sealing member into contact with said sealing ring and for axially biasing said shaft to said normal operating position, said shaft being movable axially against the bias of said spring to cause said rotary member to close said aperture and provide an inner seal whereby said sealing member may be removed from the outer end of said sleeve member upon a removal of said bearing housing without loss of fluid from said casing.

WALTER O. LUM.